US008225078B2

(12) United States Patent
Bhogal et al.

(10) Patent No.: US 8,225,078 B2
(45) Date of Patent: *Jul. 17, 2012

(54) DOCUMENT VIEWING MODE FOR BATTERY POWERED COMPUTING DEVICES

(75) Inventors: Kulvir S. Bhogal, Fort Worth, TX (US); Gregory J. Boss, American Fork, UT (US); Rick A. Hamilton, II, Charlottesville, VA (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 740 days.

This patent is subject to a terminal disclaimer.

(21) Appl. No.: 11/847,456

(22) Filed: Aug. 30, 2007

(65) Prior Publication Data
US 2009/0063873 A1    Mar. 5, 2009

(51) Int. Cl.
G06F 9/24 (2006.01)
G06F 1/32 (2006.01)
(52) U.S. Cl. ............. 713/1; 713/2; 713/100; 713/320
(58) Field of Classification Search ............ 713/1, 2, 713/100, 320
See application file for complete search history.

(56) References Cited

U.S. PATENT DOCUMENTS

| | | | | |
|---|---|---|---|---|
| 5,659,748 A * | 8/1997 | Kennedy | ............... | 713/2 |
| 5,768,164 A * | 6/1998 | Hollon, Jr. | ............... | 708/174 |
| 5,838,983 A * | 11/1998 | Atkinson | ............... | 713/322 |
| 6,006,337 A * | 12/1999 | Koo | ............... | 713/324 |
| 6,240,521 B1 * | 5/2001 | Barber et al. | ............... | 713/323 |
| 6,631,469 B1 | 10/2003 | Silvester | | |
| 6,711,631 B1 * | 3/2004 | Chan et al. | ............... | 710/14 |
| 6,836,850 B2 * | 12/2004 | Cheng | ............... | 713/324 |
| 7,421,602 B2 * | 9/2008 | Sutardja | ............... | 713/324 |
| 7,424,623 B2 * | 9/2008 | Du et al. | ............... | 713/300 |
| 2002/0023182 A1 * | 2/2002 | Jacobs et al. | ............... | 710/14 |
| 2002/0023237 A1 | 2/2002 | Yamada et al. | | |
| 2002/0162444 A1 * | 11/2002 | Yu et al. | ............... | 84/601 |
| 2004/0030877 A1 * | 2/2004 | Frid | ............... | 713/1 |
| 2004/0162922 A1 | 8/2004 | Kardach et al. | | |
| 2006/0129861 A1 * | 6/2006 | Kee et al. | ............... | 713/323 |
| 2008/0238612 A1 * | 10/2008 | Carpenter | ............... | 340/5.74 |
| 2008/0244289 A1 * | 10/2008 | LeProwse et al. | ............... | 713/320 |

FOREIGN PATENT DOCUMENTS
WO        2007035611 A2    3/2007
* cited by examiner

*Primary Examiner* — Vincent Tran
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to document viewing within a battery powered computing device and provide a method, system and computer program product for the power optimized use of a battery powered computing device for selective document viewing. In one embodiment, a battery powered computing device configured for power optimized selective document viewing can be provided. The device can include a central processing unit (CPU) and a microcontroller, both coupled to a battery, static memory, and a display within a single computing case. The device further can include a boot read only memory (ROM) programmed to selectively bootstrap into either a personal computing mode powering the CPU and display, or a document viewing mode powering the microcontroller and display.

8 Claims, 1 Drawing Sheet

DOCUMENT VIEWING MODE FOR BATTERY POWERED COMPUTING DEVICES

BACKGROUND OF THE INVENTION

1. Field of the Invention

The present invention relates to the field of battery powered computing devices including notebook style personal computers, and more particularly to the field of document viewing within a battery powered computing device.

2. Description of the Related Art

Personal computing has advanced over time beginning with the dawn of personal computing more than thirty years ago. Initially envisioned as a plaything for the home hobbyist, the personal computer quickly evolved into a significant business tool. Within a short period of time from the introduction of the first turn-key functional personal computer, computer manufactures recognized the need for a portable form of the personal computer. Consequently, the clam shell design provided initial portability for the personal computer, soon thereafter followed by the semi-portable casing of the Apple™ Macintosh™.

Despite the portable nature of the clam shell design, an AC power source still powered portable forms of the personal computer. Thus, the mobility of the computing end user remained limited to the six feet from AC outlet to personal computer. Nearly a half decade later, however, battery powered personal computers became a reality with the first laptop computer. Battery powered laptop computers liberated the personal computer from the office desk and enabled a mobile workforce that today has transformed the way in which people compute. Battery powered laptop computers literally allow the office to travel with the office worker rather than requiring the office worker to travel to the office.

Battery life has been and will always be the fundamental limitation of the battery powered portable computer. Advances in battery cell technology have lengthened the ability of one to computer by battery from merely an hour to nearly a day. Yet, the mobile computing workforce still faces on a constant basis the nearly exhausted charge of the notebook computer battery. To maximize mobile usage of the notebook computer, automated power management techniques have evolved that generally include the strategic management of display backlighting, hard drive powering and the reduction in central processing unit (CPU) speed.

Even still, most computing end users can attest to the moment when, despite best efforts at power management, they are notified of the impending exhaustion of battery life—oftentimes at a critical time when computing is of paramount importance. Mobile computing can be especially important for end users seeking to read electronic materials while lacking access to a hard copy of the same materials. In this circumstance, the notebook computer essentially transforms into an electronic book or magazine providing a view into an electronic document. When utilized as a document viewer, very few resources need be consumed by the notebook computer. Notwithstanding, no matter whether one uses a notebook computer to perform processor intensive computing or merely to view a document, without power the notebook computer becomes unusable.

BRIEF SUMMARY OF THE INVENTION

Embodiments of the present invention address deficiencies of the art in respect to document viewing within a battery powered computing device and provide a novel and non-obvious method, system and computer program product for the power optimized use of a battery powered computing device for selective document viewing. In one embodiment, a battery powered computing device configured for power optimized selective document viewing can be provided. The device can include a CPU and a microcontroller, both coupled to a battery, static memory, and a display within a single computing case. The device further can include a boot read only memory (ROM) programmed to selectively bootstrap into either a personal computing mode powering the CPU and display, or a document viewing mode powering the microcontroller and display.

In another embodiment of the invention, a method for power optimized use of a battery powered computing device for selective document viewing can be provided. The method can include powering up each of a CPU, display, dynamic memory and fixed storage in the battery powered computing device in a personal computing mode of the battery powered computing device and storing a document into static memory during the personal computing mode. The method further can include powering up a microcontroller in lieu of the CPU, dynamic memory and fixed storage in a document viewing mode of the battery powered computing device, and retrieving and displaying the document from the static memory during the document viewing mode.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for a battery powered computing device configured for power optimized selective document viewing. In accordance with an embodiment of the present invention, a battery powered computing device can be provided, including a battery power source, keyboard, CPU, memory, mass storage device and display. A microcontroller can be incorporated into the battery powered computing device, powered by the battery power source and coupled to static memory, the display and to a portion of the keyboard. The battery power computing device can be configured to boot into a normal personal computer operating mode, or into a document viewing mode.

In the former circumstance, the battery powered personal computer can operate as a personal computer and all respective devices can operate in a selected power management mode. In the latter circumstance, however, the microcontroller can operate in lieu of the respective devices to retrieve an image of a document from static memory and display the image onto the display. Navigation of the document in the display can be achieved through limited use of navigation keys on the keyboard coupled to the microcontroller. In this way, a computing end user can view a document without requiring the power consumptive operation of the respective devices of the personal computer.

Figure 1:
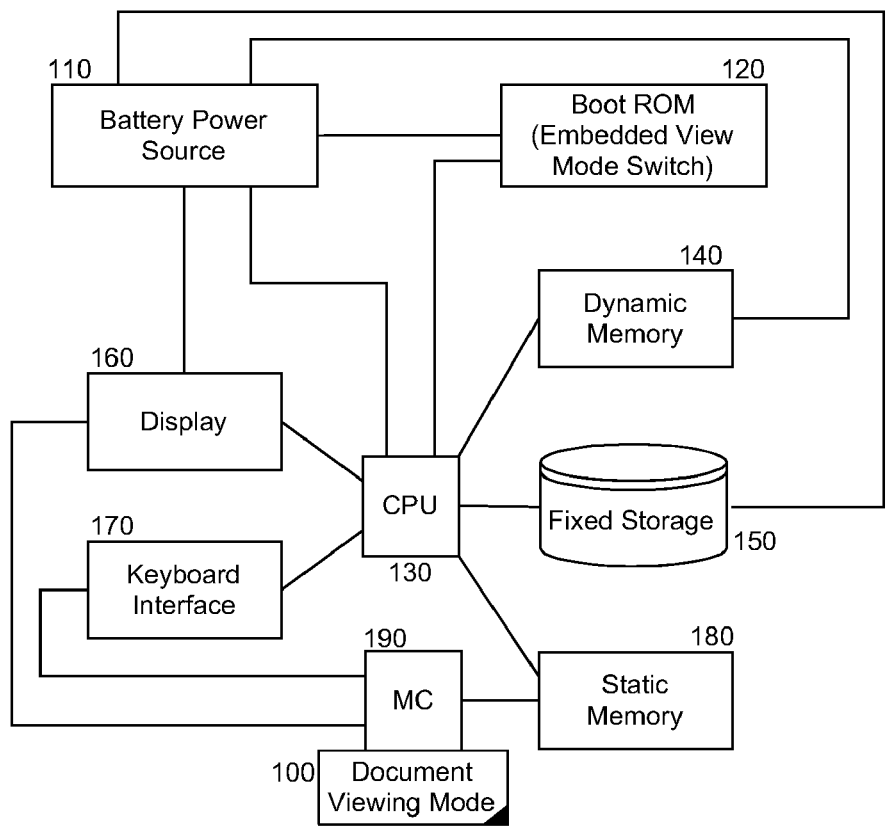
FIG. 1 is a schematic illustration of a battery powered computing device configured for power optimized selective document viewing; and, FIG. 2 is a flow chart illustrating a process for power optimized use of a battery powered computing device for selective document viewing.

In illustration, FIG. 1 is a schematic illustration of a battery powered computing device configured for power optimized selective document viewing. The battery powered computing device can include a CPU 130 powered by a battery power source 110. The battery powered computing device also can include a display 160 onto which data can be presented by the CPU 130, and a keyboard interface 170 through which data input can be received from an input device such as a keyboard or keypad. The CPU 130 can be coupled to dynamic memory 140 and fixed storage 150 so as to provide short term memory and long term memory for use by application logic executing in the CPU 130. Finally, a boot read only memory (ROM) 120 can be provided to manage bootstrap for the battery powered computing device.

A microcontroller 190 can be provided in addition to the CPU 130. The microcontroller 190, like the CPU 130, can be coupled to the display 160 and the keyboard interface 170. The microcontroller 190 further can be coupled to static memory 180 such as a flash memory. The static memory 180 in turn can be coupled the CPU 130 such that both the microcontroller 190 and the CPU 130 can access the content of the static memory 180. As such, the boot ROM 120 can include logic enabled to select a computing mode by initiating bootstrap through the CPU 130 which excludes the microcontroller 190, or to select a document viewing mode by initiating bootstrap through the microcontroller 190 to the exclusion of the CPU 130.

The CPU 130 can support the execution of an application enabled to save a document into an image suitable for display in an image viewer. In particular, the application can save the document into the static memory 180, for example as a raster image suitable for display by a raster image viewer. The microcontroller 190, in turn, can include embedded program code 100 enabled upon bootstrap to access the static memory 180 to retrieve an electronic document disposed therein. Thereafter, the program code 100 of the microcontroller 190 can be enabled to render the electronic document in the display 160.

Once the electronic document has been rendered in the display 160, the program code 100 of the microcontroller 190 can receive navigation commands from the keyboard interface 170. Responsive to the receipt of the navigation commands from the keyboard interface 170, the program code 100 can change the rendering of the electronic document in the display 160 consistently with the received navigation commands. In this way, a minimum of power will be required only to drive the display 160, keyboard interface 170 and microcontroller 190, but not the CPU 130, fixed storage 150 or dynamic memory 140.

Figure 2:
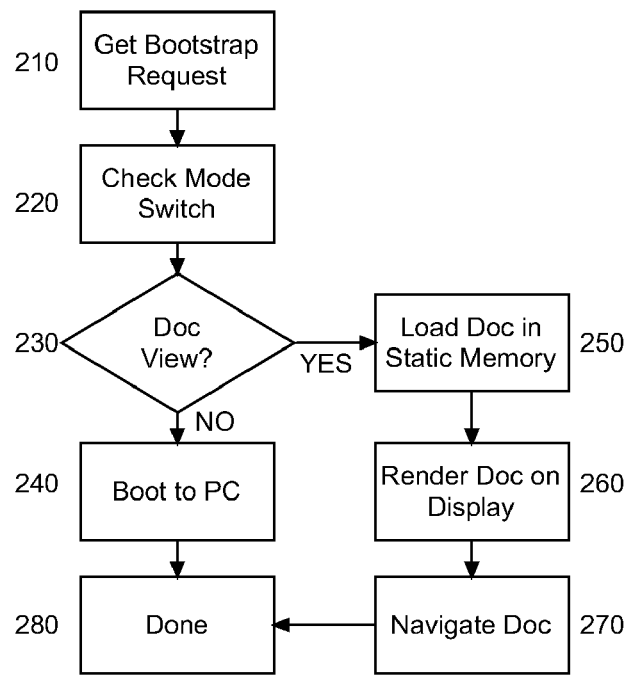

In further illustration, FIG. 2 is a flow chart illustrating a process for power optimized use of a battery powered computing device for selective document viewing. The process can begin in block 210. In block 210 a bootstrap request can be received and in block 220, a mode request switch can be checked for a current state of personal computing or document viewer. In decision block 230, it can be determined if the document viewer state has been selected. If not, in block 240 the bootstrap can proceed to boot into personal computing mode. Otherwise, in block 250 an electronic document can be loaded from static memory and in block 260, the loaded document can be rendered in the display 260. Thereafter, the document can be navigated as requested by an interacting end user in block 270. Finally, the process can end in block 280.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A battery powered computing device configured for power optimized selective document viewing, the computing device comprising:

a central processing unit (CPU) and a microcontroller, a battery, dynamic memory, fixed storage, static memory, and a display within a single computing case, the central processing unit (CPU) and the microcontroller both coupled to the battery;

a personal computing mode enabled by application logic stored in the fixed storage for enabling the CPU to save a document into the static memory and also a low-power consumption document viewing mode enabled by embedded program code embedded in the microcontroller separate from the CPU, the microcontroller being coupled to the static memory for accessing and retrieving the saved document from the static memory for viewing; and a boot read only memory (ROM) programmed to selectively bootstrap into either the personal computing mode or the low-power consumption document viewing mode.

2. The battery powered computing device of claim 1, further comprising a keyboard interface coupled to both the microcontroller and the CPU.

3. The battery powered computing device of claim 1, wherein the CPU is unpowered when the microcontroller is powered.

4. The battery powered computing device of claim 1, wherein the static memory is flash memory.

5. A method for power optimized use of a battery powered computing device for selective document viewing, the method comprising:

powering up the battery powered computing device including a central processing unit (CPU) and a microcontroller, a battery, dynamic memory, fixed storage, static memory, and a display within a single computing case;

booting into a personal computing mode enabled by application logic stored in the fixed storage for enabling the CPU to store a document into the static memory; and subsequently re-booting into a low-power consumption document viewing mode enabled by embedded program code embedded in the microcontroller separate from the CPU for accessing and retrieving the saved document from the static memory for viewing.

6. The method of claim 5, further comprising:

receiving navigation commands during the document viewing mode; and modifying a view of the document responsive to the received navigation commands.

7. A computer program product comprising a computer usable storage medium having stored therein computer usable program code for power optimized use of a battery powered computing device for selective document viewing, the computer usable program code, which when executed on the computing device, causes the computing device to perform powering up the battery powered computing device including a central processing unit (CPU) and a microcontroller, a battery, dynamic memory, fixed storage, static memory, and a display within a single computing case;

booting into a personal computing mode enabled by application logic stored in the fixed storage for enabling the CPU to store a document into the static memory; and subsequently re-booting into a low-power consumption document viewing mode enabled by embedded program code embedded in the microcontroller separate from the CPU for accessing and retrieving the saved document from the static memory for viewing.

8. The computer program product of claim 7, wherein the computer usable code further causes the computer device to perform receiving navigation commands during the document viewing mode; and modifying a view of the document responsive to the received navigation commands.

* * * * *